Nov. 14, 1933.    M. CRAWFORD    1,935,113
DIRECT SIGHTING DEVICE
Filed Nov. 10, 1930    2 Sheets-Sheet 1

INVENTOR.
Merritt Crawford
BY
ATTORNEY

Nov. 14, 1933.    M. CRAWFORD    1,935,113
DIRECT SIGHTING DEVICE
Filed Nov. 10, 1930    2 Sheets-Sheet 2
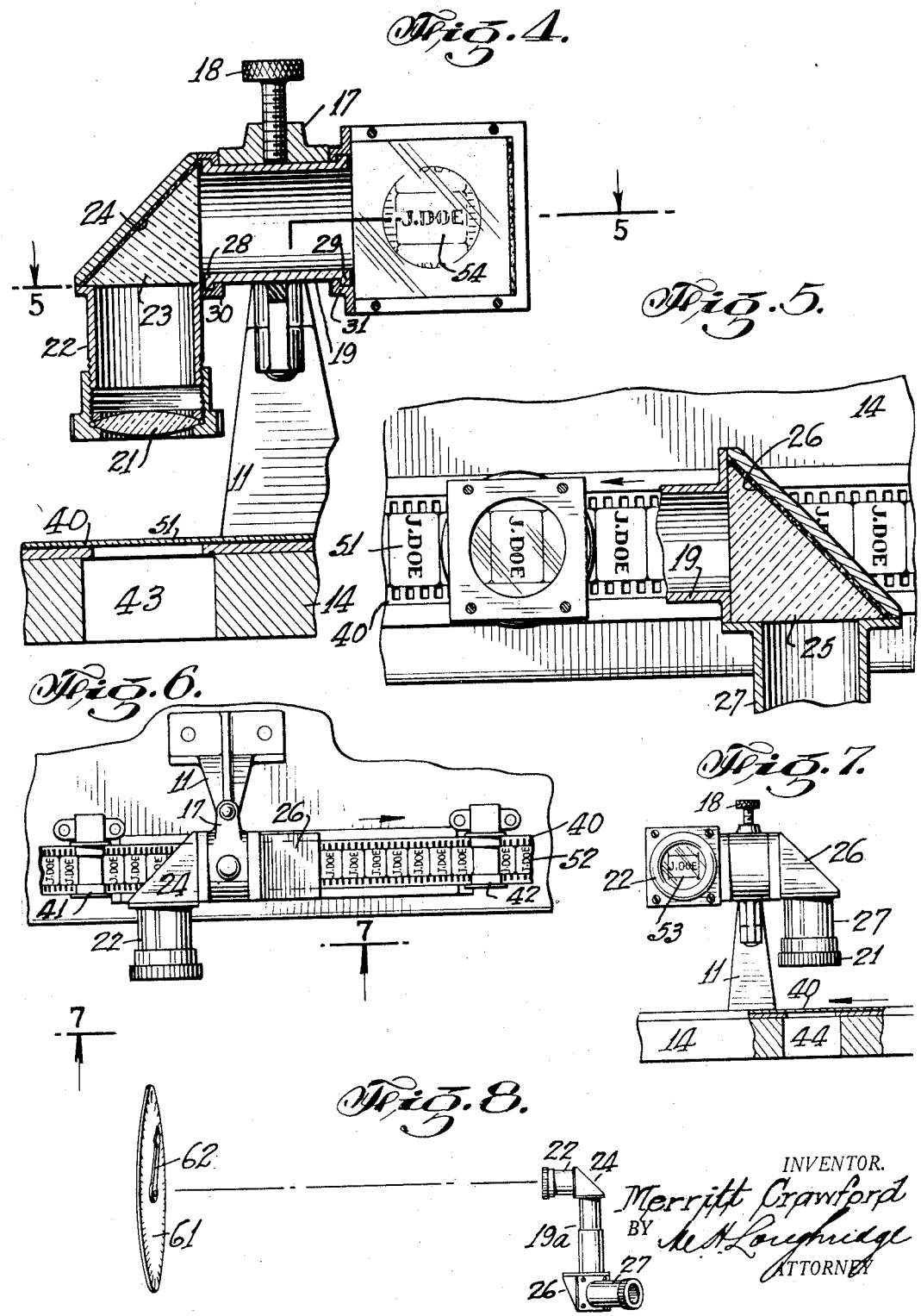
INVENTOR.
Merritt Crawford
BY
ATTORNEY Patented Nov. 14, 1933

1,935,113

UNITED STATES PATENT OFFICE 1,935,113

DIRECT SIGHTING DEVICE

Merritt Crawford, New York, N. Y.

Application November 10, 1930
Serial No. 494,632

5 Claims. (Cl. 88—14)

This invention relates to a direct sighting device that may be used to view objects at right angles and may be used to view objects in which the image of the object is seen angularly displaced from its actual position. An object of the invention is to view an object located at right angles to the observer, in its normal position; another object of the invention is to rotate the image of the object sighted, about a given center; another object of the invention is to produce the image of an object angularly displaced in either direction from its normal position; another object of the invention, when used in connection with editing or visual inspection of motion picture films, is to produce an image of the film passing in front of the operator at right angles to the operator and therefore in the normal position; other objects of the invention reside in the construction and arrangement of the system as more fully described in the following specification and illustrated in the accompanying drawings, in which, Fig. 1 is an elevation partly sectioned of an arrangement for inspecting motion picture films, embodying my invention;

Fig. 2 is a plan view corresponding to the arrangement in Fig. 1;

Fig. 3 is a side elevation of the sighting device with the supporting bench shown in section;

Fig. 4 is a side elevation, partly sectioned, showing the construction of the sighting device;

Fig. 5 is a plan view, partly sectioned, showing the device used in the inspection of motion picture film moving in a particular direction.

Fig. 6 is another plan view of the device applied to the inspection of motion picture film moving in the opposite direction to Fig. 5.

Fig. 7 is an elevation, partly sectioned, showing the adjustment of the sighting device as applied in Fig. 6, and, Fig. 8 is a perspective view of another application of this device for reading instrument dials located at right angles to the observer.

A motion picture film, according to the established practice, is leased and exchanged from one place to another and in order to guard against the use of defective films it is necessary to make frequent inspections and these inspections require that the film be unwound from the reel and observed as it passes before the inspector. In practice this is accomplished by passing the film in front of the inspector from one reel to another. The picture subjects on the film are normally placed at right angles, that is the normal position of the picture is transverse of the film and thus is at right angles to the normal position of the inspector. The sighting device of the present invention, which corresponds in principle to my co-pending application Serial No. 484,915, filed September 27, 1930, turns the picture subjects at right angles to their normal position on the film and the operator sees the picture in its normal position, thereby facilitating inspection and relieving the inspector of eye-strain. In practice, the motion picture film may be unwound from a reel at either end so that the picture subject may appear in the film to read from either side and the sighting device described herein is adjustable so that in either case the picture subject, as sighted by the device, will always appear to the operator in the normal or vertical position.

This device is mounted upon a stand by suitable pivots so that its position relative to the film and to the operator can be conveniently adjusted. This sighting device may also be used in sighting devices which are remotely located and which may be angularly displaced relative to the line of vision of the operator, as for instance, sighting the dials of instruments in aeroplanes, in power houses or the like.

In the drawings, 11 is the supporting bracket which is preferably hinged at 12 to the base 13, which is secured to the bench or table 14. The clamp 17 is pivoted at 15 for horizontal movement to the bracket 11 and this clamp is secured to the central tube 19 of the sighting device by the set-screw 18.

The sighting device comprises a receiving tube 22 mounted upon the prism 23 having a reflecting surface at 24 which reflects the image through tube 19 upon the prism 25 and the reflecting surface 26 thereof to the sighting tube 27. The tube 19 is preferably flanged at the ends as indicated at 28 and 29 and the ring 30 rotatably supports the tube 22 in position against the tube 19 and the ring 31 rotatably supports the tube 27 against the opposite end of tube 19. A condenser lens 21 is detachably secured to the receiving tube 22 when it is desired to magnify the image.

The film reel 35, Fig. 1 is mounted on stand 36 and may be rotated by the handle 37. The opposite reel 38 is mounted on a stand 39 and the film 40 moves between these reels and is guided by the rollers 41 and 42 over the inspection apertures 43 and 44 in the table 14. A source of illumination 45 is reflected by the mirror 46 through the aperture 43 and through the film 40 to the receiving tube 22 whereby the image is produced at 27. When the reflector 46 is rotated on its mounting 47 the illumination from 48 is reflected through aperture 44 to the receiving tube in another position such, for instance, as is illustrated in Fig. 7 where the image is sighted at 53.

The purpose of the prisms 23 and 25 is to turn the image of the object about its center and if these prisms are located at right angles to each other the image may be turned through a right angle. It is apparent that mirrors may be used for the same purpose as these prisms and are the full equivalent thereof.

By referring to Figs. 4 and 5 it will be noted that the caption on film 51 reads normally from the left and when the device is arranged as in Fig. 4 the image is produced at 54 in the normal position. It is obvious that if the film were turned around so as to read from the right, in Fig. 4, that the image at 54 would be inverted. This is prevented by adjusting the sighting device as indicated in Figs. 6 and 7. In this arrangement the tube 27 receives the image and is rotated on 19 to point downwards over the aperture 44 and the lens 21 may be applied to this tube. At the same time the tube 22 is rotated to the horizontal position so that the image on the film 52 which reads normally from the right appears at 53 in the normal position. When the apparatus is used in this way, mirror 46 is moved into the dotted position so as to illuminate the proper aperture in register with the receiving tube.

It is apparent that the device may be tilted on the hinge 12 to any angle that is convenient for the operator and may be adjusted longitudinally relative to the film on the pivot 15. It is also apparent that the images 53 or 54 rotate about a center in accordance with the rotation of the prisms on the tube 19 so that any angular position of the image may be established as desired.

The sighting device in Fig. 8 illustrates a dial 61 with a pointer 62 deflected from the normal plane of vision and sighted by a sighting device constructed according to this invention, preferably with a telescopic tube 19a, connecting the prisms 24 and 26 with the object of adjusting the device to conditions. This enables the operator to sight the dial at 27 in its normal position and saves space.

This invention may be applied in a variety of forms and as a portable sighting device without departing from the intent and spirit thereof.

Having thus described my invention, I claim:

1. A sighting device for sighting an object comprising a bench supporting the object, an optical device having a receiving tube with a prism and a sighting tube with a prism at right angles to the receiving tube, said prisms being placed in optical relation, a stand pivotally supporting said device to enable either tube to sight the object, said prisms being arranged by rotating said tubes relative to each other so that the image of the object as sighted by one of said tubes and viewed by the other tube is at right angles relative to the object and when viewed by the first tube and sighted by the second tube, the image is at right angles to the object and inverted with respect to the first image.

2. A sighting device for sighting an object comprising a bench supporting the object, an optical device having a receiving tube with a prism and a sighting tube with a prism, said prisms being placed in optical relation, a stand secured to said bench and supporting said optical device, means for adjusting the position of said optical device relative to said bench in two planes at right angles to each other and means whereby the functions of said receiving and sighting tubes may be exchanged.

3. A sighting device for sighting a transparent object comprising a bench having a pair of apertures supporting the object, a reflector, a pivotal mounting for selectively positioning said reflector to illuminate the object through either of said apertures, an optical device and means for adjustably positioning said device for sighting the object through either of said apertures.

4. A sighting device for sighting a transparent object, a reflector, a pivotal mounting for said reflector for positioning said reflector to illuminate different portions of the object, and an optical device comprising a receiving tube and a sighting tube and a connecting tube optically connecting said receiving and sighting tubes and upon which they are rotatably mounted and a stand supporting said device to enable the sighting tube and the receiving tube to register with the illuminated portion of the object.

5. A sighting device for sighting a transparent object comprising a bench having a plurality of apertures supporting the object, a reflector, a source of illumination for illuminating the object through said reflector and said apertures and an optical device adjustably positioned to align with either of said apertures and having a tube for sighting the object when it is illuminated, said reflector being movable for selectively illuminating the object through said apertures.

MERRITT CRAWFORD.